Dec. 7, 1926.

1,609,381

C. F. NORD

GASOLINE FILTER

Filed June 19, 1925

Inventor
C. F. Nord.

By Clarence A. O'Brien
Attorney

Patented Dec. 7, 1926.

1,609,381

UNITED STATES PATENT OFFICE.

CHARLES F. NORD, OF ONAWA, IOWA.

GASOLINE FILTER.

Application filed June 19, 1925. Serial No. 38,243.

This invention relates to improvements in filters, and is more particularly adapted for use in connection with an internal combustion engine, for filtering the gasoline before the same is delivered into the carburetor of the internal combustion engine.

A further object of the invention is to provide a gasoline filter which is of such construction as to facilitate the ready and easy attachment of the device to the feed line which extends from the gasoline tank to the carburetor of an internal combustion engine, so that the gasoline will be caused to pass through the filter, before the same enters the carburetor, thereby removing the impurities from the gasoline, so as to insure the efficient operation of the internal combustion engine.

A still further object is to provide a gasoline filter of the above mentioned character, which includes a substantially inverted conical shaped filtering screen, the same extending downwardly into the filtering chamber, a chamois extending around the filtering screen and further providing a means for filtering the gasoline before the same flows outwardly through the outlet pipe connected to the chamber.

A still further object is to provide a gasoline filter of the above mentioned character, which is simple in construction, inexpensive, strong and durable, and further well adapted for the purpose for which it is designed.

Other objects and advantages of the invention will become apparent during the course of the following detailed description.

In the accompanying drawing, forming a part of this specification, and in which like reference characters indicate corresponding parts throughout the several views.

Figure 1:
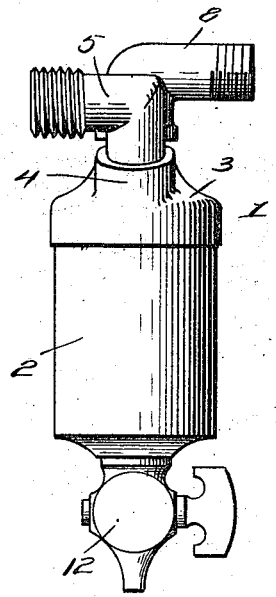
Figure 1 is a side elevation of my improved gasoline filter.
Figure 2:
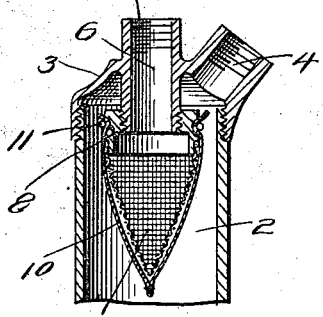
Figure 2 is a vertical sectional view, through the upper portion of the device.

In the drawing, wherein for the purpose of illustration is shown the preferred embodiment of my invention, the numeral 1 designates generally my improved filter, the same comprising the cylindrical chamber 2, the upper end of which is open and externally threaded, for receiving the internally threaded detachable cover 3. An inlet nipple 4 extends upwardly from the cover 3 adjacent the outer edge thereof and the same is adapted to receive the elbow 5, the latter being adapted to be connected to the fuel feed pipe, which extends from the gasoline tank (not shown).

A nipple 6 extends vertically through the central portion of the cover plate, the upper end of the nipple being internally threaded, as illustrated at 7, for connection with one end of the elbow 8, provided with an outlet for communication with the portion of the gasoline feed pipe which extends to the carburetor of the internal combustion engine not shown. The lower end of the nipple 6 is externally threaded, and provides a means for detachably supporting thereon the ring or band 8. The purpose of this ring or band will be presently described.

A substantially inverted conical shaped filter screen 9 formed of very fine mesh wire has its upper edge extending around the lower portion of the ring or band 8. An additional filtering member, in the form of a piece of chamois cloth 10 encloses the filtering screen 9, and is also of substantially inverted conical formation, the upper edge of the chamois cloth extending around the intermediate portion of the ring or band 8 and being detachably supported thereon, through the medium of the flexible spring wire 11. The filtering mediums 9 and 10 respectively extend downwardly into the cylindrical chamber 2, for a suitable distance.

A drain cock 12 of any suitable construction is provided at the bottom of the cylindrical chamber 2, the purpose thereof being to provide a means whereby the sediment which collects in the bottom of the chamber may be drained therefrom, when the petcock of the drain cock is opened, as is well known in the art.

The gasoline will enter the cylindrical chamber 2 through the inlet nipple 4. The gasoline will be caused to flow upwardly, in order to pass outwardly from the chamber 2, into the outlet nipple 7, from where the fuel is conducted to the feed pipe which extends to the carburetor (not shown). In passing upwardly, the gasoline must necessarily pass through the chamois cloth 10, and the filtering screen 9, thereby enabling the gasoline to be thoroughly filtered, so that the impurities will be removed from the fuel before the same enters the outlet nipple 7, and as a result, the impurities in the gasoline will collect on the chamois cloth, and will gradually settle in the bottom of the chamber where it may be drawn off through the drain cock 12.

A gasoline filter of the above mentioned character will at all times be positive and efficient in carrying out the purposes for which it is designed and furthermore, the same is of such construction as to enable the several parts to be readily disassembled, in order that they may be easily and readily cleaned.

While I have shown the preferred embodiment of the invention, it is to be understood that various changes in the size, shape and arrangement of parts may be resorted to without departing from the spirit of the invention or the scope of the appended claim.

What is claimed is:

A gasoline filter comprising a cylindrical chamber open at its top, a removable cover therefor, an upwardly inclined inlet nipple cast integrally with the cover, a vertical outlet nipple extending centrally through the cover, and cast integrally therewith, the lower end thereof being threaded, a ring detachably threaded on the lower end of the outlet nipple, a substantialy inverted conical filtering screen extending downwardly within the cylindrical chamber and having its upper end surrounding said ring, an additional filtering member of chamois cloth surrounding the conical filtering screen, a spring wire encircling the upper portion of the filtering element and said ring for detachably securing the same on said ring.

In testimony whereof I affix my signature.

CHARLES F. NORD.